United States Patent
Agombar et al.

(10) Patent No.: US 8,140,814 B2
(45) Date of Patent: Mar. 20, 2012

(54) RESOURCE RECLAMATION IN DATA STORAGE

(75) Inventors: John P. Agombar, Hampshire (GB); Christopher B. Beeken, Hampshire (GB); Carlos F. Fuente, Southampton (GB); Simon Walsh, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/515,712

(22) PCT Filed: Nov. 8, 2007

(86) PCT No.: PCT/EP2007/062045
§ 371 (c)(1),
(2), (4) Date: May 20, 2009

(87) PCT Pub. No.: WO2008/061892
PCT Pub. Date: May 29, 2008

(65) Prior Publication Data
US 2010/0070734 A1    Mar. 18, 2010

(30) Foreign Application Priority Data

Nov. 22, 2006    (GB) .................................. 0623255.7

(51) Int. Cl.
G06F 12/02    (2006.01)
G06F 12/00    (2006.01)

(52) U.S. Cl. ......... 711/171; 711/E12.001; 711/E12.002; 707/674; 707/E17.005

(58) Field of Classification Search ................. None
See application file for complete search history.

(56) References Cited

U.S. PATENT DOCUMENTS

| 6,151,666 A * | 11/2000 | Blendermann et al. ....... 711/170 |
| 7,454,686 B2 | 11/2008 | Broadbent et al. |
| 7,870,464 B2 | 1/2011 | Hafner et al. |
| 7,908,512 B2 | 3/2011 | Deenadhayalan et al. |
| 2004/0068636 A1 | 4/2004 | Jacobson et al. |
| 2004/0181476 A1 | 9/2004 | Smith et al. |
| 2005/0207235 A1 | 9/2005 | Blendermann et al. |

(Continued)

FOREIGN PATENT DOCUMENTS

| EP | 0 668 555 A2 | 8/1995 |
| KR | 1020050081656 A | 8/2005 |
| WO | WO 2008/061892 A1 | 5/2008 |

OTHER PUBLICATIONS

Communication sent to International Bureau of WIPO, Article 19 Amendments, Jun. 2, 2008, 4 pages.

(Continued)

*Primary Examiner* — Denise Tran
(74) *Attorney, Agent, or Firm* — Francis Lammes; Stephen J. Walder, Jr.; Randall J. Bluestone

(57) ABSTRACT

Managing resource reclamation in data storage systems is provided. A volume deletion metadata recorder records metadata for one or more deleted volumes. A policy engine, responsive to a predetermined policy rule, applies the policy rule to the metadata. The policy engine initiates policy-controlled data storage space reclamation for the one or more deleted volumes. A volume reclaimer, responsive to the policy engine, reclaims data storage space from the one or more deleted volumes. A resource allocator allocates the data storage space to satisfy a minimum requirement for available zeroed extents that comprise a minimum requirement to satisfy needs of late allocated storage volumes.

18 Claims, 4 Drawing Sheets

U.S. PATENT DOCUMENTS

2006/0248231 A1* 11/2006 O'Rourke et al. ............ 709/245
2008/0282105 A1   11/2008 Deenadhayalan et al.
2009/0157956 A1*  6/2009 Kano ........................... 711/112
2010/0217752 A1   8/2010 Deenadhayalan et al.

OTHER PUBLICATIONS

Written Opinion of the International Searching Authority, PCT/ISA/237, Apr. 7, 2008, 5 pages.

* cited by examiner

RESOURCE RECLAMATION IN DATA STORAGE

BACKGROUND

The present invention relates to technology for managing device controllers, and more particularly to managing resource reclamation (or "scavenging") in data storage systems.

Many file systems and storage subsystems provide a facility for recovering deleted files. A simple example of this would be the Microsoft® Windows® operating system's Recycle Bin where, if the user accidentally deletes a file, they can go to the Recycle Bin, list the deleted files and then select the file(s) that they want to recover. (Microsoft and Windows are trademarks or registered trademarks of Microsoft Corporation in the United States and elsewhere). The file is then made available again to the user. In this environment, the Recycle Bin will gradually fill up and free space on the system will eventually run out. Windows today monitors the free space and under some circumstances offers the administrator a prompt along the lines of "you are running out of space—do you want to empty the recycle bin to make some more"—which the administrator must explicitly accept in order to free up space.

When this concept is extended to a virtualised storage environment, volumes are saved in a Recycle Pool and, at some point, free extents run out. When this occurs, the creation of new volumes will fail and users must manually select which volumes to permanently delete from the Recycle Pool to free up extents. After doing this, they can retry the volume create command and, if enough extents are now free, the command will succeed.

Late allocated volumes can be created in a virtualised storage environment. When they are created, they have no physical extents allocated. Host writes to unallocated extents cause the system to dynamically allocate physical extents. Host reads to unallocated extents must return all zeros. To ensure that host writes can always be honoured, the system needs to keeps a pool of zeroed unallocated extents (extents that have been cleared of data) available. If the pool were to become empty the system would not be able to allocate an extent for a write and would have to fail back to the host and take the late allocation volume offline. In this situation there is no opportunity for a user to step in and manually delete volumes from the recycle bin to free up extents. This kind of manual intervention is also unacceptable in a large system with many administrators and no single point of control.

SUMMARY

In one illustrative embodiment, a mechanism is provided for managing resource reclamation in data storage systems. The illustrative embodiment records metadata for one or more deleted volumes. The illustrative embodiment applies a predetermined policy rule to the metadata. In the illustrative embodiment the policy engine initiates policy-controlled data storage space reclamation for the one or more deleted volumes. The illustrative embodiment reclaims a data storage space from the one or more deleted volumes. The illustrative embodiment allocates the data storage space. In the illustrative embodiment, the data storage space is allocated to satisfy a minimum requirement for available zeroed extents. In the illustrative embodiment the minimum requirement for available zeroed extents comprises a minimum requirement to satisfy needs of late allocated storage volumes.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

A preferred embodiment of the present invention will now be described, by way of example only, with reference to the accompanying drawing figures, in which.

DETAILED DESCRIPTION

The illustrative embodiments are implemented in a data storage system in which late allocated volumes can be created. Late allocated volumes are volumes which, at the time of their creation, have no underlying real storage extents associated with them. Real storage extents are then supplied by the system as needed, that is, when a write to the late allocated volume occurs. It will, however, be clear to one of ordinary skill in the art that the inventive concepts illustrated by the preferred, exemplary embodiment may also be applied in other data storage systems, such as, for example, any data storage systems in which a just-in-time or on-demand provision of data storage may be contemplated.

During the course of data processing, volumes that have been in use may become redundant, and thus may be returned to a recycle pool, ready to be either manually selected for reuse, or, if necessary, placed back in use. The latter may occur, for example, if an action that would cause the volume to become redundant were to fail. In the known art, if more storage is required, there is a need for manual intervention to select volumes from the recycle pool to be permanently deleted and returned to the system for use, for example, to satisfy a late allocated volume's requests for extents.

Figure 1:
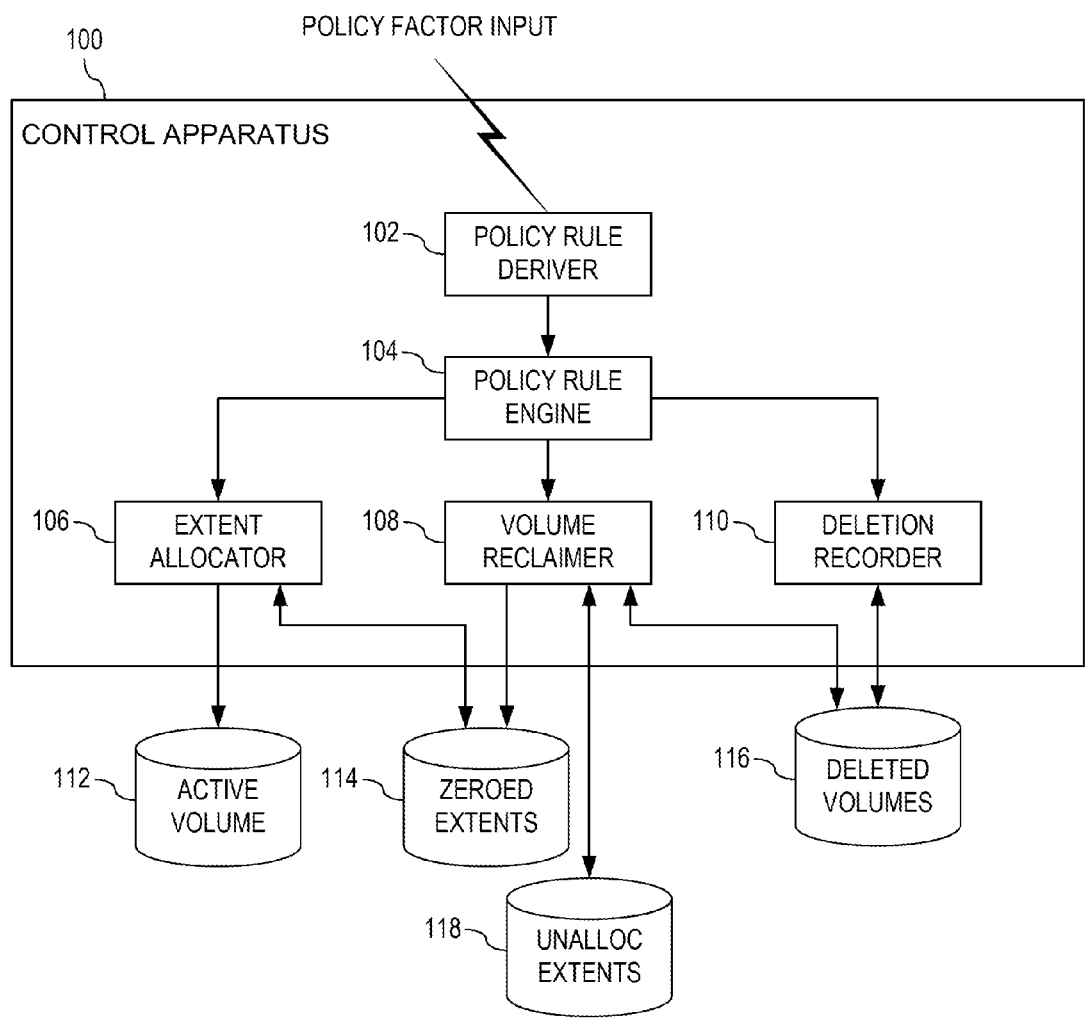
FIG. 1 shows in schematic form an apparatus, or an arrangement of apparatus, in accordance with a preferred embodiment of the present invention.

In FIG. 1 is shown in schematic form an arrangement of apparatus in accordance with a preferred embodiment of the illustrative embodiments. In FIG. 1, a control apparatus 100 is operatively connected to one or more active volumes 112, one or more deleted volumes 116, and to storage for zeroed extents 114 and unallocated extents 118. Control apparatus 100 comprises a policy rule deriver 102 for deriving one or more policy rules based on one or more policy input factors and for supplying the derived policy rule or rules to policy rule engine 104. Policy rule engine 104 is operatively coupled to deletion recorder 110, which records metadata relating to deleted volumes 116. Policy rule engine 104 is further operatively coupled to extent al locator 106, such that when one or more extents are required to satisfy a requirement for space of active volume 112, which action will deplete the number of zeroed extents 114 below a predetermined threshold, the policy rule engine 104 applies the derived policy rules to the metadata from deletion recorder 110. The policy rules engine then initiates an action by volume reclaimer 108 to reclaim one or more extents from deleted volumes 116 and to supply a satisfactory number of extents from deleted volumes 116 to zeroed extents 114. Remaining, currently-unneeded extents may then be placed in unallocated extents 118 for future use.

The illustrative embodiments may be in the form of an apparatus or arrangement of apparatus thus advantageously addresses the problem of providing a technical framework for managing resource reclamation (or "scavenging") in data storage systems.

In the illustrative embodiments, when volumes are moved to the Recycle Pool their "delete characteristics" are recorded. Examples of these characteristics could be the time that the volume was deleted or the reason that it was deleted (for example data migration, shrinking or deleting a volume). These characteristics, together with the original characteristics of the volume (e.g., the volume size or the volume type) can then be used in the specification of policy rules such as:

First in First Out—The volume in the recycle pool with the earliest delete date or time is the one whose extents are used first.

Volume Shrink Used First—Extents in the recycle pool that were placed there as a result of volume shrink are used first.

Striped Volume Used First—Extents in the recycle pool that came from Striped volumes are used first.

It will be clear to one of ordinary skill in the computing art that other characteristics could be used to define more complex rules.

These rules are used to define a policy to specify how extents are reclaimed (or "scavenged") from the Recycle Pool. For example in a system with late allocation volumes, a threshold can be defined that ensures that a pool of zeroed unallocated extents is maintained that contains at least 2 extents for every late allocation volume in the system. To maintain this pool, extents may be scavenged from the Recycle Pool, for example, according to the policy rules "Striped Volume Used First" followed by "First in First Out". Such an arrangement is illustrated, by way of example, in FIG. 2.

Figure 2:
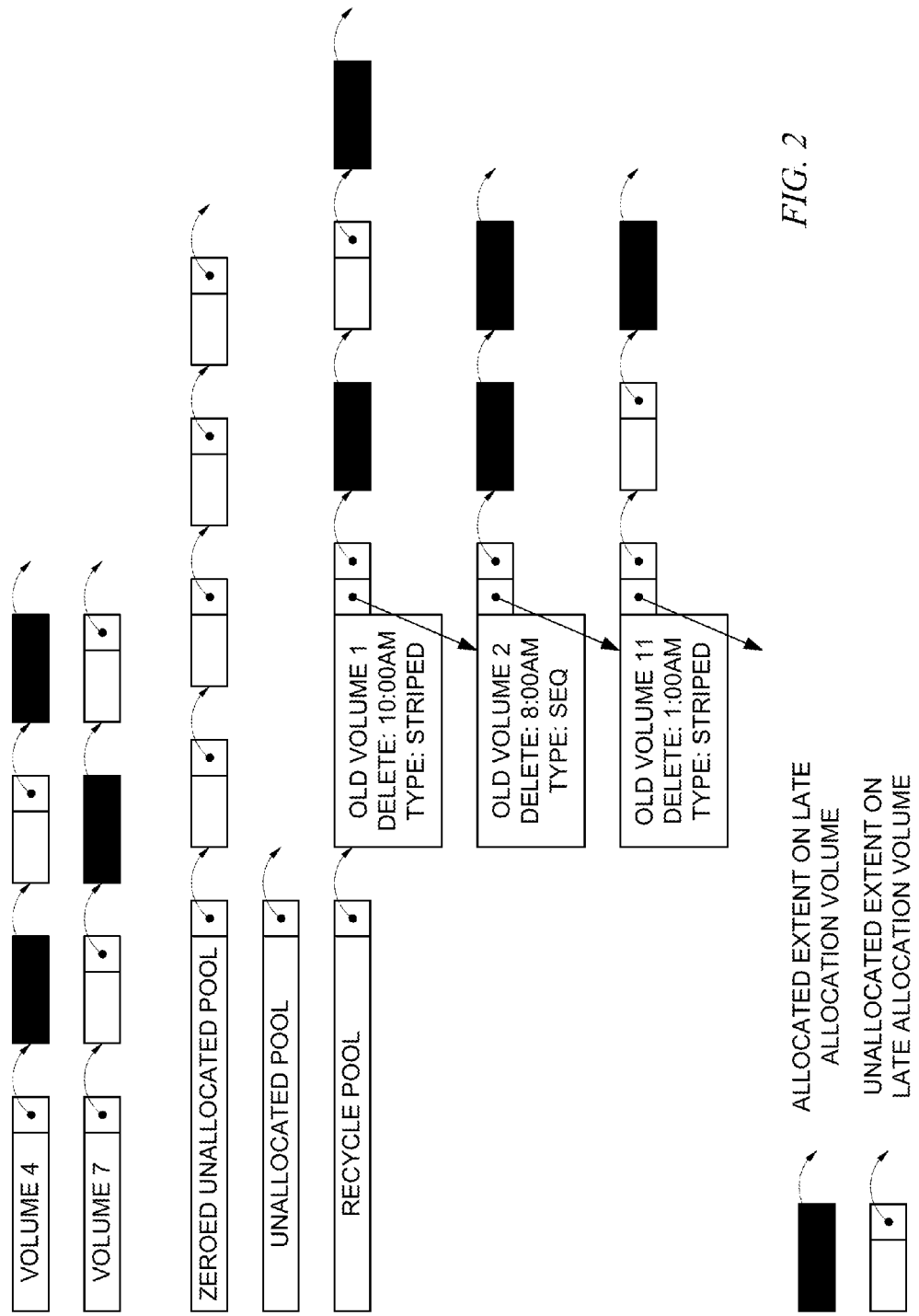
FIG. 2 shows a data structure according to a first stage in resource scavenging.

In FIG. 2, there are shown two late allocation volumes (volume 4 and volume 7). The exemplary scavenging threshold of the illustrated embodiment defines that there must be at least 2*2 extents in the zeroed unallocated pool and the pool currently contains 4 extents. If a write I/O was then to occur which required the first extent of volume 7 to be allocated, the system would allocate an extent from the zeroed unallocated pool. As there are no extents in the Unallocated Pool to zero, the exemplary scavenging policy rules would then need to be applied:

Striped Volume Used First—There are 2 volumes in the Recycle Pool that are striped—old volume 1 and old volume 11; and First in First Out—Of these 2 volumes, volume 11 was deleted at 1:00 am so was the first volume to be deleted and hence is the one to be scavenged.

Figure 3:
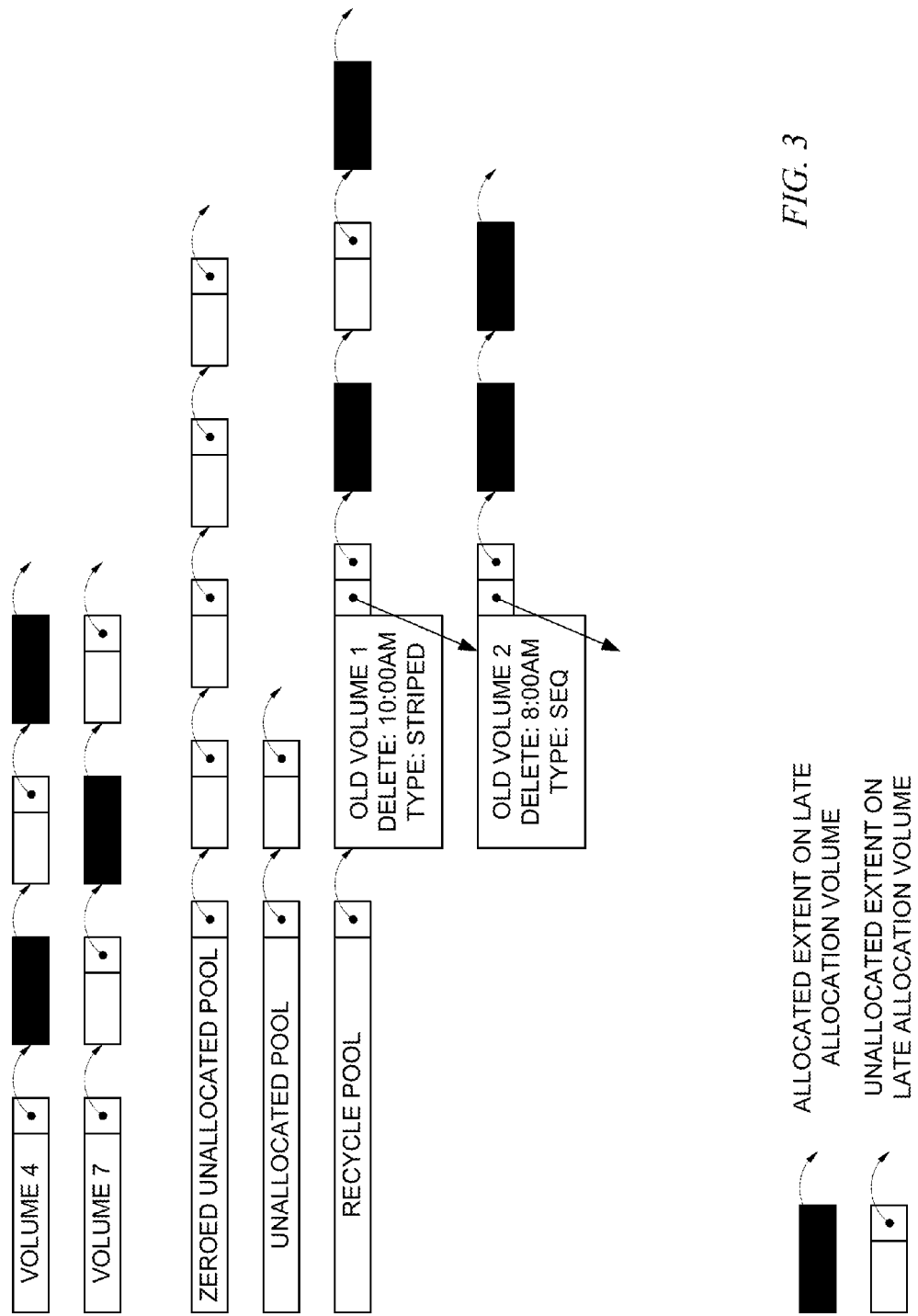
FIG. 3 shows a data structure according to a second stage in resource scavenging.

Following the application of the policy rules and the zeroing of the scavenged extents, the system would appear as illustrated in FIG. 3. From the scavenged volume, one extent has been zeroed and added to the Zeroed Unallocated Pool to satisfy the policy rules. The other extent from the scavenged volume has been added to the Unallocated pool.

As will be clear to one of ordinary skill in the art, such a system may have a default policy rules or may allow the user to define the policy rules, for example, when configuring the system, or at any other time, in accordance with the user requirements and priorities.

Figure 4:
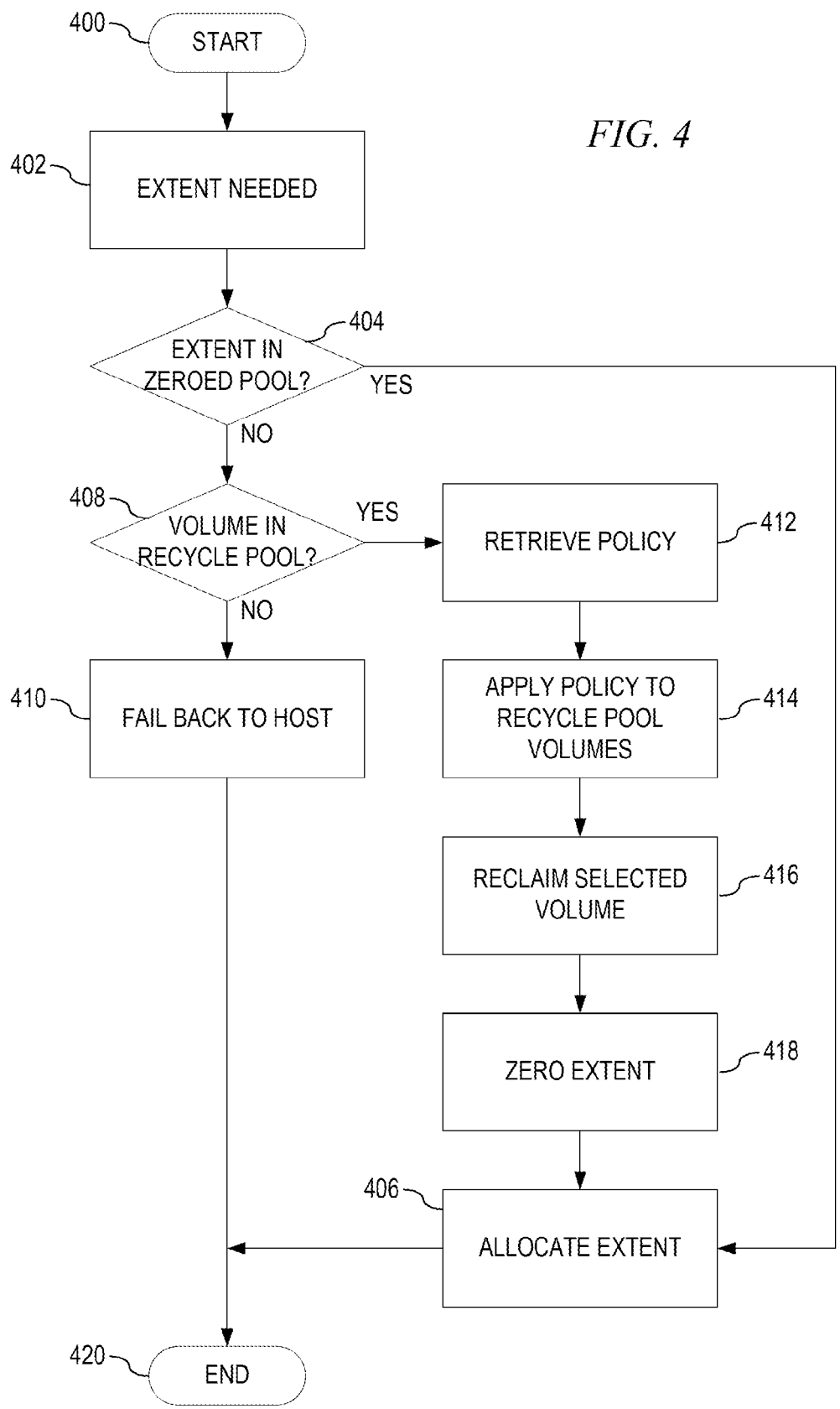
FIG. 4 shows in flowchart form one method or one logic arrangement in which a method of operation according to a preferred embodiment of the present invention may be implemented.

FIG. 4 shows, in flowchart form, a generalized process flow in accordance with an illustrative embodiment.

In FIG. 4, the method begins at START step 400. At step 402, an extent is required to meet the requirements for zeroed extents for use by one or more late-allocated active volumes. At test step 404, the system determines whether or not there are sufficient extents in the zeroed pool to satisfy the need and to maintain the required threshold level of zeroed extents for use by a late allocated volume. If the test step 404 returns a positive outcome, the extent is allocated by the extent allocator at step 406 and the process ends at END step 420. If the test step 404 returns a negative outcome, at test step 408 it is determined whether or not there is a volume in the recycle pool from which extents may be reclaimed. If the test step 408 returns a negative outcome, the storage system must fail back to the host at step 410 and the process ends at END step 420. If test step 408 returns a positive outcome, the policy rules are retrieved at step 412 and applied, at step 414, to the metadata relating to recycle pool volumes stored by the deletion recorder. The policy-selected volume is reclaimed by the volume reclaimer at step 416, and one or more extents from the volume to satisfy the requirement are zeroed at step 418. Any extents not required may be left unzeroed for future use. At step 406, the required one or more extents are allocated by the extent allocator, and the process ends at END step 420.

The illustrative embodiments of the present invention may be in the form of a method or logic arrangement thus advantageously addresses the problem of providing a technical framework for managing resource reclamation (or "scavenging") in data storage systems.

It will be clear to one of ordinary skill in the art that all or part of the method of the illustrative embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the illustrative embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The illustrative embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques. including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the illustrative embodiments of the present invention may be realized in the form of computer implemented method of deploying a service comprising steps of deploying computer program code operable to, when deployed into a computer infrastructure and executed thereon, cause said computer system to perform all the steps of the method.

It will be clear to one skilled in the art that many improvements and modifications can be made to the foregoing exemplary embodiment without departing from the scope of the present invention.

The invention claimed is:

1. An apparatus for managing resource reclamation in data storage systems comprising:
   a processor; and
   a memory coupled to the processor, wherein the memory comprises instructions which, when executed by the processor, cause the processor to:
   record metadata for one or more deleted volumes;
   apply a predetermined policy rule to the metadata,
   wherein the policy engine initiates policy-controlled data storage space reclamation for the one or more deleted volumes;
   reclaim a data storage space from the one or more deleted volumes; and
   allocate the data storage space, wherein the data storage space is allocated to satisfy a minimum requirement for available zeroed extents and wherein the minimum requirement for available zeroed extents comprises a minimum requirement to satisfy needs of late allocated storage volumes.

2. The apparatus of claim 1, wherein the one or more deleted volumes are marked deleted but available for recovery.

3. The apparatus of claim 1, wherein the predetermined policy rule is user-specifiable.

4. The apparatus of claim 1, wherein the metadata comprises a representation of characteristics of the deleted volumes.

5. The apparatus of claim 1, wherein the metadata comprises a representation of a reason for deletion of the deleted volumes.

6. The apparatus of claim 5, wherein the predetermined policy rule is preferential according to the reason for deletion of the deleted volumes.

7. A method, in a data processing system, for managing resource reclamation in data storage systems, the method comprising:
   recording, by a volume deletion metadata recorder, metadata for one or more deleted volumes;
   applying, by a policy engine, a predetermined policy rule to the metadata,
   wherein the policy engine initiates policy-controlled data storage space reclamation for the one or more deleted volumes;
   reclaiming, by a volume reclaimer, a data storage space from the one or more deleted volumes; and
   allocating, by a resource allocator, the data storage space, wherein the data storage space is allocated to satisfy a minimum requirement for available zeroed extents and wherein the minimum requirement for available zeroed extents comprises a minimum requirement to satisfy needs of late allocated storage volumes.

8. The method of claim 7, wherein the one or more deleted volumes are marked deleted but available for recovery.

9. The method of claim 7, wherein the predetermined policy rule is user-specifiable.

10. The method of claim 7, wherein the metadata comprises a representation of characteristics of the deleted volumes.

11. The method of claim 7, wherein the metadata comprises a representation of a reason for deletion of the deleted volumes.

12. The method of claim 11, wherein the predetermined policy rule is preferential according to the reason for deletion of the deleted volumes.

13. A computer program product comprising a non-transitory computer readable medium having a computer readable program recorded thereon, wherein the computer readable program, when executed on a computing device, causes the computing device to:
   record metadata for one or more deleted volumes;
   apply a predetermined policy rule to the metadata, wherein the policy engine initiates policy-controlled data storage space reclamation for the one or more deleted volumes;
   reclaim a data storage space from the one or more deleted volumes; and
   allocate the data storage space, wherein the data storage space is allocated to satisfy a minimum requirement for available zeroed extents and wherein the minimum requirement for available zeroed extents comprises a minimum requirement to satisfy needs of late allocated storage volumes.

14. The computer program product of claim 13, wherein the one or more deleted volumes are marked deleted but available for recovery.

15. The computer program product of claim 13, wherein the predetermined policy rule is user-specifiable.

16. The computer program product of claim 13, wherein the metadata comprises a representation of characteristics of the deleted volumes.

17. The computer program product of claim 13, wherein the metadata comprises a representation of a reason for deletion of the deleted volumes.

18. The computer program product of claim 17, wherein the predetermined policy rule is preferential according to the reason for deletion of the deleted volumes.

* * * * *